United States Patent Office 3,770,682
Patented Nov. 6, 1973

3,770,682
EMULSIFICATION OF SULFONATED BUTYL RUBBER
Addison W. Hubbard, Scotch Plains, Kenneth W. Powers, Berkeley Heights, and Charles P. O'Farrell, Clark, N.J., assignors to Esso Research and Engineering Company
No Drawing. Filed Jan. 20, 1972, Ser. No. 219,496
Int. Cl. C08d 7/00, 7/10, 7/18
U.S. Cl. 260—29.7 B          18 Claims

ABSTRACT OF THE DISCLOSURE

Sulfonated butyl rubber containing greater than 0.5 mole percent $SO_3H$ is emulsified by dissolving the acid form of the polymer in a suitable solvent incorporating into the solvent rubber cement about 5 to 30 wt. percent of a polar cosolvent and using as emulsifiers nonionic emulsifiers at least one of which is an ethoxylated $C_8-C_{12}$ alkyl phenol. In a preferred embodiment, at least one emulsifier is a water dispersible or water soluble emulsifier and is dispersed in the water into which the cement is to be dispersed.

The organic and polar solvents may be stripped from the emulsion along with excess water to form latices suitable for use as coatings and film formers.

BACKGROUND OF THE INVENTION

This invention relates to a method for producing aqueous emulsions and latices of sulfonated butyl rubber.

It is well known in the art to produce synthetic latices of high polymers by preparing the polymer by emulsion polymerization. This method, however, is not applicable to high polymers made by essentially anhydrous polymerization. Methods have been developed for preparing latices of such polymers by preparing emulsions of the polymer from cements of the polymer and thereafter stripping off the polymer solvent and some of the water to produce concentrated latices suitable for use as coatings and film formers. Such latices of the high polymers are prepared from solvent solutions thereof by the steps of (1) providing a dispersion or cement in a volatile organic solvent for the polymer, (2) adding to such dispersions, water and aqueous emulsifier and emulsifying the same to produce an emulsion, (3) stripping the volatile solvent and (4) recovering the resulting latex product; see, for example, U.S. Patent 3,503,917 incorporated herein by reference.

Recently, sulfonated ionomers of butyl rubber have been prepared. These polymers have improved tensile strength and other improved physical properties in the raw, unvulcanized gum state; see, for example, U.S. patent application 877,849, now U.S. Patent 3,642,728, incorporated herein by reference. The excellent physical properties of these unvulcanized polymers suggest their use in latices. It has not heretofore, however, been possible to prepare latices from these sulfonated rubbery polymers.

Methods for preparing latices of commercial sulfonated polyethylene are known in the art wherein a salt of a polymeric sulfonic acid derived from the polyethylene is dissolved in a water-miscible solvent more volatile than water. Thereafter water and a precipitant compound are added to cause opalescence; see, for example, U.S. Patent 3,245,935 incorporated herein by reference.

Latices from polymers of vinylidene compounds and their hydrogenated products have been prepared from emulsions with the addition subsequent to emulsification of about 1 to about 70 volume percent based on the water phase of a highly water soluble oxygen compound of about 2 to 10 carbon atoms; see, for example, U.S. Patent 3,310,516, incorporated herein by reference. It has been taught that improved results are obtained if the water component is water immiscible; see, for example, U.S. Patent 3,305,508, incorporated herein by reference. Conventional butyl rubbers and generally most synthetic polymers are emulsified by the use of cationic or anionic emulsifiers. However, these emulsifier systems have not been used successfully to emulsify sulfonated butyl rubber containing at last 0.5 mole percent sulfonic acid groups.

SUMMARY OF THE INVENTION

It has surprisingly been found that emulsions of sulfonated butyl rubber may be prepared by (1) dissolving the sulfonic acid form of the polymer in a suitable organic solvent, (2) incorporating in the cement so formed about 5 to about 30 wt. percent based on the cement of polar solvent selected from the group consisting of $C_2-C_{10}$ alcohols, ketones, ethers, and esters, and (3) using as the emulsifier system at least two emulsifiers, the blend of which has an HLB of about 14 to 19, said emulsifiers being selected from the group consisting of ethoxylated or propoxylated $C_8-C_{10}$ alkyl phenols, ethoxylated or propoxylated $C_8-C_{12}$ alcohols, ethoxylated or propoxylated oxides and mixtures thereof. The emulsions so formed may be converted to latices by stripping off the solvents and excess water.

DETAILED DESCRIPTION OF THE INVENTION

This invention relates to a method for preparing emulsions of sulfonated butyl rubber, in particular, the invention relates to the preparation of latices from these emulsions.

The term "butyl rubber" as used in the specification and claims means copolymers of isoolefins and conjugated dienes which comprise about 0.5 to about 15 mole percent conjugated diene and about 85 to 99.5 mole percent isoolefin. Illustrative examples of the isoolefins which may be used in the preparation of butyl rubber are isobutylene, 2-methyl-1-propene, 3-methyl-1-butene, 4-methyl-1-pentene and β-pinene. Illustrative examples of conjugated dienes which may be used in the preparation of butyl rubber are isoprene, butadiene, 2,3-dimethyl butadiene, chloroprene, piperylene, 2,5-dimethylhexa-2,4-diene, cyclopentadiene, cyclohexadiene and methyl-cyclopentadiene. The preparation of butyl rubber is described in U.S. Patent 2,356,128 and is further described in an article by R. M. Thomas et al. in Industrial and Engineering Chemistry, vol. 32, pp. 1283 et seq., October, 1940.

The preparation of sulfonated butyl rubber is well known in the art. Butyl rubber may be sulfonated by reacting a solution of butyl rubber in a suitable solvent for the butyl rubber with a sulfonating agent. The sulfonating agent may be an acyl sulfate or a complex of a Lewis base and a sulfur trioxide donor. Illustrative examples of Lewis bases which may be used are trialkyl phosphates, dioxanes, trialkyl amines, etc. A detailed description of the manner of preparing sulfonated butyl rubber may be found in U.S. application Ser. No. 877,849, and U.S. application Ser. No. 123,908. This invention is in no way intended to be limited by the method of producing the sulfonated butyl rubber.

Although the usual methods for preparing sulfonated butyl rubber invariably include the step of neutralizing the sulfonic acid, it has surprisingly been found that it is essential in the preparation of the emulsions that the acid form rather than the neutralized form be used. The neutralized form of the rubber has substantially improved thermal stability and physical properties including tensile strength. The acid form which has reactive hydrogens can be involved in various chemical reactions and can form bonds to various surfaces to yield improved adhesion. However, as a dry rubber this enhanced chemical reactivity cannot be taken advantage of because the poor thermal stability of the acid-form precludes drying it. It has been found, however, that the acid form of the sulfonated polymer can nevertheless be successfully converted to a latex and advantage can then be taken of its reactivity. Latices formed from the acid form of the polymer may also be post neutralized to realize the advantageous properties of the neutralized ionomers. In latex form, the advantages of both forms of sulfobutyl can be realized.

The emulsifiers which may be used in the practice of this invention are limited to nonionic emulsifiers. Surprisingly, the anionic or cationic emulsifiers which are used to emulsify conventional butyl rubber are not suitable for the emulsification of the sulfonated butyl rubber although these ionic emulsifiers are suitable and are generally the preferred types in emulsifying other polymers.

In the preparation of emulsions, a handy tool for determining emulsion systems which may be used for emulsification is the hydrophilic-lyophilic balance (HLB). It is known in the art that each system to be emulsified has a particular HLB depending on whether the emulsion systems are to be oil-in-water or water-in-oil. Where the systems are to be oil-in-water emulsions, as is the case in the preparation of latices, the HLB of the system must be greater than 7. A combination of emulsifiers which have an HLB of less than 7 will not ordinarily produce stable oil-in-water emulsions and will generally produce water-in-oil emulsions.

All systems have two HLB's, one at which stable water-in-oil emulsions are formed and one at which stable oil-in-water emulsions are formed. Ordinarily, in the preparation of emulsions, the HLB of a particular system is determined by using emulsifiers of known HLB and by trial and error determining the HLB which gives the more stable emulsion. HLB, however, is not the only determining factor. The hydrophobe portion of the emulsifiers must be of a particular chemical family in order to prepare stable emulsions of a particular system. Although emulsions may be formed at the proper HLB even though the optimum hydrophobe is not selected, the emulsions are relatively unstable. In referring to emulsifiers and emulsions in this specification only stable emulsion systems, e.g. those which are not readily separated, are considered.

HLB is a measure of the percentage of the emulsifier molecule which is hydrophilic. Emulsifiers whose molecule is 100% hydrophilic (water soluble) have an HLB of 20. The HLB of a particular emulsifier is determined by calculating the weight fraction of the emulsifier which is hydrophilic and multiplying that fraction times 20. Hence, an emulsifier which comprises a molecule having a 50 wt. percent hydrophilic portion and 50 wt. percent hydrophobe will have an HLB of 10.

It has not been possible to determine the HLB for the sulfonated butyl rubber systems in advance using standard HLB references. Therefore, it was necessary by trial and error to establish the HLB by first finding systems which would emulsify and form stable emulsions of the sulfonated polymer and thereafter calculate the HLB of the system. On this basis, the HLB of a sulfonated butyl rubber system dissolved in a hydrocarbyl $C_6$–$C_{10}$ solvent is about 14 to about 19. The HLB requirement of a sulfonated butyl rubber solution is a function of degree of sulfonation of the butyl and of the solvent composition. The HLB requirement gets higher as the degree of sulfonation is raised and as the percentage of polar diluent used in conjunction with the hydrocarbyl solvent is increased. While the HLB determination is not precise, it can normally be pinpointed to within 0.5 to 1.0 units. Emulsion stability is normally adequate when the HLB of the emulsifier system is within 1 unit of the HLB requirement determined for the particular sulfobutyl cement being emulsified.

It is well known that emulsifier systems of a particular HLB may be selected from blends of emulsifiers which results in the required HLB. The most stable emulsions are prepared when at least two emulsifiers having substantially different HLB's are utilized. Hence, it is preferred that one of the emulsifiers be very hydrophilic and hence be easily either water dispersible or water soluble; that is, have an HLB of greater than 16 and the other emulsifier be more lipophilic and be only moderately water soluble or perhaps even oil soluble or oil dispersible; that is, have an HLB of less than 12.

The hydrophilic portions of the emulsifier suitable for use in this invention must be at least partly polyethylene oxide. The hydrophobe may be a $C_8$–$C_{12}$ alkyl phenol, a $C_4$–$C_8$ dialkyl phenol, a $C_{12}$–$C_{20}$ alcohol, a $C_{12}$–$C_{20}$ fatty acid, a $C_{12}$–$C_{20}$ amide, a polypropylene oxide, etc.

Illustrative examples of the emulsifiers which may be used in the practice of this invention are Neutronyx 622, an ethoxylated octyl phenol comprising 4 moles of ethylene oxide (EtO); Neutronyx 675, an ethoxylated octyl phenol comprising 30 moles of EtO; Igepal CO–530, an ethoxylated nonyl phenol comprising 6 moles of EtO; Triton X–100, an ethoxylated octyl phenol comprising about 9.5 moles of EtO; Tergitol NP–14, an ethoxylated nonyl phenol comprising 4 moles of EtO; Emulphogene BC–720, an ethoxylated tridecyl alcohol comprising 15 moles of EtO; Emulphogene BC–940, an ethoxylated tridecyl alcohol comprising 30 moles of EtO; Siponic Y–500, an ethoxylated oleyl alcohol comprising 17 moles of EtO.

Another class of emulsifiers suitable for use in the practice of this invention are Pluronics emulsifiers. These have the general structure EtO–PPO–EtO. In the preferred types, the polypropylene oxide unit (PPO) has a molecular weight of about 1750. Each of the EtO groups is of approximately equal molecular weight. Pluronics L61 is comprised of 15 wt. percent EtO, Pluronics L64 is comprised of 45 wt. percent EtO and Pluronics F68 comprises about 85% EtO. These emulsifiers are referred to in the specification and claims as ethoxylated polypropylene oxide. The preferred ethoxylated polypropylenes have a PPO segment of about 1500–2000 molecular weight and substantially equal molecular weight EtO groups, the EtO comprising about 15 to 50 wt. percent of the polymer.

For purposes of simplicity in referring to particular emulsifiers, trade names will be used. The Igepal group of emulsifiers have distinct names which completely describe them and therefore their chemical generic name is readily discernible from the trade name. For example, Igepals having a code name preceded by CA are ethoxylated $C_8$ alkyl phenol. Igepals with code names preceded by CO are ethoxylated nonyl phenols; whereas Igepals whose code number is preceded by RC are ethoxylated $C_{12}$ alkyl phenols. The first two numbers of the code numbers indicate the approximate wt. percent of combined ethylene oxide. The third number suggests the percent activity of the Igepal itself. For example, Igepal CO–530 is an ethoxylated nonyl phenol comprising about 53% ethylene oxide in the molecule. The formula for the ethoxylated alkyl phenols is

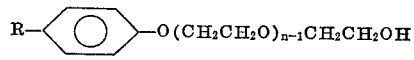

wherein R is an alkyl radical of 8 to 12 carbon atoms and $n$ is the moles of ethylene oxide in the molecule. In determining the HLB of such a molecule, the alkyl phenol portion is taken as the hydrophobe; the polar ethylene oxide portion is the hydrophilic portion.

The emulsifier blend must be used at a concentration of about 5 to about 25 wt. percent based on the polymer; more preferably, about 10 to about 20 wt. percent, e.g. 15 wt. percent. Table I shows various emulsifier blends which have the proper HLB to emulsify sulfonated butyl rubber. The HLB of each of these systems is shown in the right-hand column. The HLB is calculated as indicated above by multiplying the weight fraction of the hydrophilic portion of the molecules times 20. Given the formula of hydrophobes which are suitable for use in emulsifying the sulfonated butyl rubber and the HLB of the system, those skilled in the art will recognize that it will be obvious to substitute emulsifiers of different HLB for those taught by applicants having the same hydrophobes so long as the blend of emulsifiers has the required HLB of the sulfonated butyl rubber system.

TABLE I

| | | Weight ratio | HLB |
|---|---|---|---|
| 1 | Neutronyx 675 | 2 | 16 |
| | Igepal CO-530 | 1 | |
| 2 | Neutronyx 675 | 2.0 | 16.7 |
| | Triton X-100 | 1.0 | |
| 3 | Neutronyx 675 | 2.0 | 15.3 |
| | Tergitol NP14 | 1.0 | |
| 4 | Neutronyx 675 | 0.75 | 14.7 |
| | Pluronic F-68 | 0.75 | |
| | Igepal CO-530 | 1.50 | |
| 5 | Neutronyx 675 | 1.0 | 16 |
| | Emulphogene BC-720 | 1.0 | |
| 6 | Emulphogene CC-840 | 1.0 | 14.7 |
| | Pluronics F-68/L-61, 85/15 blend | 1.0 | |
| | Igepal CO-530 | 1.0 | |
| 7 | Emulphogene BC-840 | 0.75 | 14.5 |
| | Pluronic F-68 | 0.75 | |
| | Igepal CO-530 | 1.50 | |
| 8 | Pluronic F-68 | 1.0 | 15.5 |
| | Siponic Y-500 | 1.0 | |
| 9 | Neutronyx 67 | 5 | 17.0 |
| | Igepal CO-530 | 1 | |

In preparing emulsions of highly sulfonated butyl rubber, it is essential that only the acid form of the polymer be used since surprisingly it has not been found to be possible to emulsify the sulfonated neutralized polymer. If desired, the acid form of the polymer may be neutralized after the emulsion is formed by adding a salt or amine to the emulsion. Neutralizing agents for the sulfonic acid containing butyl rubber are taught in U.S. application 877,849, incorporated herein by reference. Any of these neutralizing agents may be utilized.

The preferred neutralizing metallic compounds are ompounds of sodium, barium or calcium. Additionally, amines, in particular tertiary amines, may be used to neutralize the sulfuric acid polymer.

A cement is prepared of the acid form of the sulfonated butyl rubber comprising the polymer and a suitable solvent. Any solvent which is a suitable solvent for butyl rubber may be used. For example, hydrocarbon solvents, halogenated hydrocarbons, $CS_2$, etc., may be used. Illustrative examples of the hydrocarbon solvents are $C_4$–$C_{10}$ paraffinic hydrocarbons, e.g., butane, pentane, hexane, heptane, octane, nonane, etc.; $C_1$–$C_8$ chlorinated hydrocarbons, e.g. methylene chloride, ethylene chloride, chloropropane, chlorohexane, etc. and $C_6$–$C_{12}$ aromatic hydrocarbons, e.g. benzene or $C_7$–$C_{12}$ alkyl or dialkyl benzene such as toluene, xylene, diethyl benzene, etc. The invention is in no way intended to be limited by the solvent used. The term "alkylated benzene" as used in the specification and claims means $C_7$–$C_{12}$ alkyl and dialkyl benzene.

The emulsifiers which as already discussed must be nonionic may be dissolved completely in the water phase or in the oil phase, or split between them but it is preferred that at least one of the emulsifiers be dissolved in the water phase. As used in the specification and claims, the term "oil phase" means the solution of polymer and organic solvents.

In addition to the hydrocarbon solvent it has surprisingly been found to be essential to include in the oil phase a polar organic solvent. In fact, efforts to prepare latices of highly sulfonated butyl rubber proved to be completely fruitless until the technique of employing a polar cosolvent was discovered. Polar cosolvents are not required or usually even desirable in the emulsification of other hydrocarbon polymers (i.e. butyl rubber) and in those instances where polar cosolvents have been employed (see U.S. 3,305,508) the polar cosolvent has not been essential to achieve emulsification but rather has been used to control particle size or more particularly to suppress foaming during solvent stripping. In fact, in the prior art in which polar cosolvents have been employed it has generally been found to be preferable to add some or all of the polar cosolvent subsequent to emulsification (see U.S. 3,310,516).

In the preparation of latices of highly sulfonated butyl rubber, on the other hand, the polar cosolvent performs quite a different roll. Rather than functioning merely as a foam suppressor as in the prior art, the polar cosolvent is a required part of the emulsification system. In the absence of the polar cosolvent no stable oil-in-water emulsions of highly sulfonated butyl rubber can be prepared. Invariably, in the absence of polar cosolvent and regardless of the HLB of the emulsifier system, it is only possible to prepare water-in-oil emulsions with highly sulfonated butyl rubber. Surprisingly the desired oil-in-water emulsions can only be achieved by including a polar cosolvent as part of the total emulsification system.

Not wishing to be bound by theory, it is believed that the requirement for a polar cosolvent in the preparation of latices of highly sulfonated butyl rubber can be explained as follows: Sulfonated butyl rubber belongs to the group of polymers classified as "ionomers." In bulk, or in solution in non-polar or hydrocarbon solvents the polar sulfonic acid groups attached to the polymer chains are thought to associate with each other to form polar "regions" or "domains." These polar "domains" exist within, or are surrounded by, a non-polar or hydrocarbon matrix. This is analogous to the situation which exists in water-in-oil emulsions in which a polar region (water) is surrounded by a non-polar region (oil); but is exactly opposite to that required for oil-in-water emulsions in which a non-polar region (oil) is surrounded by a polar region (water). Thus, sulfonated butyl rubber naturally exists in a morphology conducive to forming water-in-oil emulsions. It is relatively easy for water to enter the pre-existing polar "domains" to form a water-in-oil emulsion and in the absence of polar cosolvent these are the only emulsions which can be achieved. In order to produce the desired oil-in-water emulsions it is necessary to overcome a substantial energy barrier. The polar sulfonic acid groups must first be dissociated from one another, then moved through the hydrocarbon phase, and finally be pulled out into the water so that the desired morphology of a polar phase surrounding a non-polar phase is produced. In the absence of polar cosolvent, this energy barrier is apparently too great to be overcome.

When the proper polar cosolvent is added, however, it enters and solvates the polar "domains" so that they become weaker and more diffuse. Also, provided the polar cosolvent is at least partly water miscible, it tends to be leached out into the water phase when the cement (or oil phase) is mixed into water. As the polar cosolvent is "leached" out into the water it can help pull the polar sulfonic acid groups out into the water, too, thereby reducing the energy barrier and helps to produce the desired configuration for an oil-in-water emulsion in which the sulfonic acid groups must stick out into a continuous water phase surrounding the "oil" droplets. The requirements for being able to emulsify only the acid form of sulfonated butyl rubber (not the neutralized forms) and for being able to utilize only nonionic emulsifiers are believed to be releated to this same energy barrier. When sulfonated butyl is neutralized very strong ionic bonds are formed between the sulfonic acid groups so that the "domains" become much stronger and it becomes even more difficult to break them up and pull the polar groups out into a surrounding water phase as is required for oil-in-water emulsions.

In order to produce oil-in-water emulsions it has been found necessary to include about 5 to 30 wt. percent based on the oil phase of a polar cosolvent. The optimum amount and type of polar cosolvent required is a function of sulfonation level of the butyl polymer and must be determined experimentally.

Generally, however, the amount of polar cosolvent required increases as the sulfonation level is increased. When the wrong type or to little cosolvent is used, no stable oil-in-water emulsions can be found. When too much of the right polar cosolvent is employed it tends to excessively diminish stability of the "raw" (or unstripped) latex so that coagulation is encountered during processing and stripping. Thus, the right polar solvent must be used and the polar cosolvent level must be controlled within a relatively narrow range at any given sulfonation level. The polar solvent may be an alcohol, ester, ketone, ether. The hydrocarbyl portion of the polar solvent should be a $C_2$–$C_{10}$ alkyl. Branched and straight chain hydrocarbyl radicals may be used. The term "polar solvent" as used in the specification and claims means a $C_2$ to $C_{10}$ organic compound containing oxygen in the form of an alcohol, ether, ketone or ester, having a dielectric constant of about 3 to about 50. The polar solvent may be either water soluble or only partly miscible with water but it is preferred that it be water soluble. Illustrative examples of such polar solvents are ethanol, isopropanol, n-propanol, butanols, hexanols, heptanols, octanols, methyl ethyl ketone, isobutyl ketone, diethyl ether, tetrahydrofuran, ethyl acetate, methyl acetate, ethyl formate, etc.

The term "oil phase" as used in the specification and claims means the sulfonated rubber-solvent cement.

The rubber cement preferably contains about 5 to 25 wt. percent solids, more preferably about 8 to about 20 wt. percent, most preferably about 10 to about 18 wt. percent. The solids content of the cement is not critical. However, high solids content results in viscous, difficult-to-disperse cements and low solids content requires excessive stripping to prepare latices.

The advantages of the instant invention may be more readily appreciated by reference to the following examples.

EXAMPLE 1

A butyl rubber cement comprising 16.9 wt. percent solids in hexane was sulfonated in the following manner: 8.6 liters of cement were placed in a 10-liter 4-neck flask equipped with a stirrer and condenser. The acetyl sulfate solution was prepared by adding 22 ml. of sulfuric acid (96%) to 46.8 ml. of acetic anhydride. 42.4 milliliters of acetyl sulfate solution was added to the cement

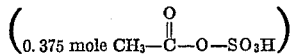

The reaction was allowed to continue for 30 minutes. Analysis of the polymer recovered from cement showed that it contained 1.2 mole percent sulfonic acid as determined by Dietert sulfur analysis. The unsulfonated polymer had a Mooney viscosity of about 60 (ML 260° F., 1+3 min., 2.0 r.p.m.) and an average molecular weight $\overline{M_v}$ of about 450,000.

A portion of the sulfonated polymer was neutralized with ethyl amine and the neutralized polymer had a Mooney viscosity of 76 (ML 260° F., 5+8 min., 0.2 r.p.m.).

Unless otherwise indicated in the remaining examples, the term "sulfonated butyl cement and neutralized sulfonated butyl cement" refers to the above-described polymer and neutralized polymer.

EXAMPLE 2

Results are poor without polar cosolvent at >0.5 mole percent $SO_3H$

An attempt as made to prepare an emulsion of a sulfonated butyl cement (acid form) at a relatively low sulfonation level using Pluronic L–64 and Neutronyx 622 as the emulsifiers. Formulation:

Water phase: Grams
  Distilled water _____ 186
  Pluronic L–64 _____ 2.5
Oil Phase:
  Sulfonated butyl cement (0.5 mole percent $SO_3^-H^+$) _____ 300
  Neutronyx 622 _____ 3

The Pluronic L–64 as dissolved in water and the Neutronyx 622 as dissolved in the cement. The oil phase was added slowly to the water phase in a dispersator set at a wide gap and at a speed (variac) setting of 70 volts. About 10% of the cement mixed in well. Then the emulsion inverted to a water-in-oil form and thickened. It became a heavy paste after standing a few days. Ultimately, it was a non-homogeneous mixed emulsion. This shows that even a polymer with only 0.5 mole percent $SO_3^-H^+$ cannot be emulsified without a polar cosolvent.

EXAMPLE 3

Polar cosolvent (10% on cement) aids emulsification

The experiment of Example 2 was repeated except that 30 grams of isopropyl alcohol was added to the oil phase.

Water phase: Grams
  Distilled water _____ 186
  Pluronic L–64 _____ 2.5
Oil phase:
  Sulfonated butyl cement (0.5 mole percent $SO_3^-H^+$) _____ 300
  Neutronyx 622 _____ 3
  Isopropyl alcohol _____ 30

When the oil phase was poured into the water phase in the dispersator all of the cement emulsified readily and gave an oil-in-water emulsion of good appearance, low viscosity and low foam. The emulsion was stable and did not thicken or separate after several days of standing.

EXAMPLE 4

3% polar cosolvent is insufficient concentration

The experiment of Example 2 was repeated using 10 g. of isopropyl alcohol in the formulation. When an attempt was made to emulsify the cement, emulsification proceeded readily until about 90% of the oil phase was added. Then inversion occurred and the cement thickened. The emulsion was a heavy paste after a few days of standing.

EXAMPLE 5

Additional hydrocarbon solvent is of no value

The experiment of Example 2 was repeated substituting 30 g. of hexane for the isopropyl alcohol so that the oil phase would be the same volume.

Water phase: Grams
  Distilled water _____ 186
  Pluronic L–64 _____ 2.5
Oil phase:
  Sulfonated butyl cement (0.5 mole percent $SO_3^-H^+$) _____ 300
  Neutronyx 622 _____ 3
  Phillips n-hexane _____ 30

The emulsion formed inverted to the water-in-oil form after about 10% of oil phase had been added to the water. After standing about three days the emulsion was a heavy paste. It is evident from these examples that a polar cosolvent must be present in the cement at a level of at least 5 wt. percent based on the cement.

EXAMPLE 6

Polar cosolvent permits emulsification of highly sulfonated polymers also

Example 3 was repeated with a polymer of higher sulfonation level to demonstrate that the acid form of highly sulfonated butyl can be emulsified in suitable formulation. An emulsion was prepared from the following formulation:

Water phase: | Grams
---|---
Distilled water | 186
Pluronic L-64 | 2.5

Oil phase:
Sulfonated butyl cement (1.2 mole percent $SO_3^-H^+$) | 300
Neutronyx 622 | 3
Isopropyl alcohol | 30

The Pluronic L-64 emulsifier was dissolved in the water and the Neutronyx 622 emulsifier and isopropyl alcohol cosolvents were mixed with the cement in the oil phase. The oil phase thus prepared was then added to the water phase in the Gifford-Wood Homomixer (Dispersator) set at open gap and at a speed setting of 70 volts. A good emulsion was formed from the start and all the water phase was added without difficulty. The mixer was then set at 110 volts and the gap was closed for more severe shear. No problems were encountered and the final emulsion was fluid, had excellent appearance and remained unchnaged after several days of standing.

EXAMPLE 7

The salt form of sulfonated butyl cannot be emulsified

A portion of the sulfonic acid cement of Example 1 was neutralized with stoichiometric quantities of ethylamine. The following formulation was prepared.

Water phase: | Grams
---|---
Distilled water | 186
Pluronic L-64 | 2.5

Oil phase:
Sulfonated butyl cement | 300
Isopropyl alcohol | 30
Neutronyx 622 | 3

The mixing procedure used was identical to that of Example 6. As soon as the cement addition was started, the mixture coagulated to a stiff rubbery mass and the mixer had to be turned off. There was little evidence of oil-in-water emulsion.

EXAMPLES 8, 9 AND 10

The salt form of sulfonated butyl cannot be emulsified

The experiment of Example 7 as repeated except the sulfonic acid cement was neutralized with stoichiometric quantities of sodium hydroxide, triethanol amine, and potassium hydroxide respectively. In all three cases, no emulsions could be formed. A stiff rubbery mass was formed as soon as the cement addition was started as for Example 7.

EXAMPLES 11-19

The salt form cannot be emulsified even when emulsifier system is varied

The experiment of Example 7 was repeated except that the emulsifier system was changed so that each of the nine systems listed in Table I was tried. In each case the result was the same. A stiff rubbery mass formed as soon as cement addition was started and no emulsions could be formed.

EXAMPLE 20

Sulfonated butyl cannot be emulsified without a polar cosolvent

Water phase: | Grams
---|---
Distilled water | 400
Neutronyl 675 | 4
Igepal CO-530 | 2

Oil phase:
Sulfonated butyl cement (1.2 mole percent $SO_3H$) | 300

The Neutronyx 675 and Igepal CO-530 were dissolved in water. The oil and water phases were shaken together in a separatory funnel. There was very little mixing. The cement remained segregated and solidified as a water-in-oil paste so that it could not be readily poured out of the funnel.

EXAMPLE 21

Polar cosolvent makes emulsification of sulfonated butyl possible

The experiment of Example 20 was repeated except that 67.5 grams (22.5% on cement) of isopropyl alcohol was added to the oil phase.

Water phase: | Grams
---|---
Distilled water | 400
Neutronyx 675 | 4
Igepal CO-530 | 2

Oil phase:
Sulfonated butyl cement (1.2 mole percent $SO_3H^+$) | 300
Isopropyl alcohol | 67.5

When the water and oil phases were shaken together in a separatory funnel, an emulsion immediately formed. This emulsion was run through a dispersator at wide gap and at a speed of (variac setting) 70 for 5 minutes. The emulsion was then run at closed gap and at a variac setting of 110 for five minutes. The resulting emulsion was quite fluid, stable and had an excellent appearance. After several days of standing, there was no change in the stability or appearance of the emulsion. A sample was examined under the light microscope with the conclusion that particle size was indeed satisfactory. Most of the particles were <0.5 micron in diameter.

EXAMPLE 22

Illustration of all process steps in preparation of finished sulfonated butyl latex with polar cosolvent

Water phase: | Grams
---|---
Distilled water | 1600
Neutronyx 675 | 18
Triton X-100 | 18

Oil phase:
Sulfonated butyl cement (1.5 mole percent $SO_3H^+$) | 1200
Isopropyl alcohol | 202

The Neutronyx 675 and Triton X-100 were dissolved in water, and the alcohol was mixed with the cement. Water and oil phases were shaken together thoroughly in a separatory funnel.

The starting emulsion looked good and was allowed to stand overnight. It still looked good. The emulsion was refined in the dispersator, first under mild conditions and then under the most severe conditions possible (closed gap and 110 volts variac). Behavior and appearance were excellent. The emulsion was then given three passes through a colloid mill, set with a tight nip. No difficulties were encountered. The crude latex was very fluid and excellent in appearance. No creaming was apparent on standing, indicating that particle size was low. This acid-form crude latex was filtered through cheese cloth and distilled under vacuum to remove all solvents and as much water as possible. Behavior was excellent. When the latex in the pot started to increase slightly in viscosity, the distillation was terminated and the latex filtered through cheese cloth. No coagulum was collected on the cloth. The latex was quite fluid, smooth and generally excellent in appearance. It had little tendency to cream on standing, indicating again that particle size was good (low). Solids of this latex was 37 wt. percent.

EXAMPLE 23

N-propyl alcohol is more effective than isopropyl alcohol as polar cosolvent

The following formulations were compared in emulsification trials:

|  | Grams | |
| --- | --- | --- |
|  | A | B |
| Water phase: | | |
| Distilled water | 1,065 | 1,065 |
| Neutronyx 675 | 21.0 | 21.0 |
| Igepal CO-530 | 4.2 | 4.2 |
| Isopropyl alcohol | 84.6 | |
| n-Propyl alcohol | | 84.6 |
| Oil phase: | | |
| Sulfonated butyl cement (1.2 mole percent $SO_2H^+$) | 846 | 846 |
| Isopropyl alcohol | 93.0 | |
| n-Propyl alcohol | | 93.0 |
| Cement solids, wt. percent in hexane | 16.5 | 16.5 |
| Emulsifier conc., phr | 18 | 18 |
| HLB | 17 | 17 |

Formulations A and B above were mixed in an identical manner as described below: (a) The oil phase was poured slowly into the water phase in a dispersator (Gifford-Wood Homomixer) at a medium speed (70 volts) and at an open setting (1 inch). When all the oil was added the speed was set at high speed (110 volts) and the setting (clearance) was adjusted to a closed position and the mixing completed. Both formulations ran well, but mixture B was more fluid (desirable, characteristic) at the end of this step. (b) The crude emulsions from (a) were then milled in a colloid mill by passing the entire batches through the machine three times at a very tight nip setting. Both A and B ran well, but again B was more fluid at the end of this step. Microscopic analysis showed that mixture A contained many cement particles in the range of 3–6$\mu$ and a few up to the 8–10 range, whereas mixture B had a fair number up to 3$\mu$ and only one or two particles up to 5$\mu$ (the maximum). Estimated average particle size was 3$\mu$ for A and 1$\mu$ for B.

The conclusion drawn from this experiment was that excellent emulsions can be obtained with either isopropyl or n-propyl alcohol as the cosolvent, but that n-propyl is clearly superior to isopropyl alcohol in overall performance.

EXAMPLE 24

Too much polar cosolvent destabilizes the latex

The following formulation was tested:

Water phase: Grams
    Distilled water _____ 360
    Neutronyx 675 _____ 4
    Igepal CO-530 _____ 2
    Isopropyl alcohol _____ 40
Oil phase:
    Sulfonated butyl cement 66-1644-100 (1.5 mole percent $SO_3^-H^+$) _____ 300
    Isopropyl alcohol _____ 67.5

Neutronyx 675, Igepal CO-530 and alcohol were dissolved in the water, and the alcohol was mixed into the cement. Total alcohol concentration on the cement was 35.9 wt. percent. Water and oil phases were then shaken together thoroughly in a separatory funnel. The emulsion looked good. The mixture was run on a dispersator at a wide gap and at a speed setting of 70 on the variac for 5 minutes. It still looked good. The emulsion was then run at a closed gap and at a setting of 110 volts, but it coagulated in 2 minutes.

The conclusion from the above experiment was that the very high (35.8 wt. percent on cement) concentration of isopropyl alcohol caused the formulation to be mechanically unstable in the dispersator and hence unsuitable for latex preparation.

EXAMPLE 25

The following formulations were compared in emulsification trials:

|  | Grams | | |
| --- | --- | --- | --- |
|  | A | B | C |
| Water phase: | | | |
| Distilled water | 1,065 | 1,065 | 1,065 |
| Neutronyx 675 | 21.0 | 21.0 | 21.0 |
| Igepal CO-530 | 4.2 | 4.2 | 4.2 |
| n-Propyl alcohol | 84.6 | 106 | 67.6 |
| Oil phase: | | | |
| Sulfonated butyl cement (1.2 mole percent $SO_3H^+$) | 846 | 846 | 846 |
| Isopropyl alcohol | 51 | 51 | 51 |
| n-Propyl alcohol | 42.3 | 55 | 16.9 |
| Cement solids, wt. percent | 16.5 | 16.5 | 16.5 |
| Emulsifier conc., phr | 18 | 18 | 18 |
| HLB | 17 | 17 | 17 |
| Total R-OH conc., wt. percent on cement | 21 | 25 | 16 |

Formulations A, B and C were mixed in an identical manner as described below: (a) The oil phase was poured slowly into the water phase in a dispersator (Gifford-Wood Homomixer) with a medium speed setting of 70 volts and at an open setting of 1 inch. When all the oil was added, the speed was set at a high level of 110 volts and clearance reduced to a closed position. The refining was then completed. All three formulations ran well in the dispersator, but A and B were more fluid than C at the end of the mixing. (b) The crude emulsions from step (a) were then milled in a colloid mill by passing the entire batches through the machine three times at a very tight nip setting. By visual observation, all three formulations ran well in the colloid mill, but there were important differences in particle size as determined by microscopic analysis.

|  | Microns | | |
| --- | --- | --- | --- |
|  | A | B | C |
| Most particles | <1 | <1 | <1 |
| Many particles to | 3 | 3 | 5 |
| Some particles to | | | 10 |
| Few particles to | 8 | 8 | 20 |
| Est. avg. particle size | 3 | 3 | 5 |

It is seen in the above results that improved performance (smaller particle size) is realized by increasing alcohol from 16 to 21 wt. percent on cement, but that no further improvement is gained in going from 21 to 25.

EXAMPLE 26

Effect of polar cosolvent type in the emulsification of sulfonated butyl

A series of experiments was run to test the effectiveness of several polar cosolvents. The constant factors were as follows:

Cement solids, wt. percent _____ 16
Sulfonation level, mole percent $SO_3^-H^+$ _____ 1.2

Isopropyl alcohol used for reaction quench, wt. percent on cement _____ 6
Emulsifier system, wt. ratio Neutronyx 675/Igepal CO-530 _____ 5/1
HLB _____ 17
Emulsifiers, phr _____ 18
Polar cosolvent added, wt. percent on cement _____ 10

In each case the cosolvent was mixed with the cement in a graduated cylinder, water phase added, and the phases shaken together vigorously by hand. The test results were as follows:

(1) Tetrahydrofuran—Fairly good emulsion which thickens somewhat on standing.
(2) Methyl alcohol.—Poor result. Lumpy and coagulates completely on standing.
(3) n-Butyl alcohol.—Excellent emulsion.
(4) Methyl ethyl ketone.—Fair emulsion. Lumpy, but much better than with no cosolvent at all.
(5) Isopropyl alcohol.—Fair to good emulsion. Slightly lumpy at first but smooths out with continued shaking.
(6) n-Propyl alcohol.—Very good emulsion. No lumps, and shakes together more easily than test 5 with isopropyl alcohol.
(7) No cosolvent.—Will not go together at all. Cement solidifies in lumps without emulsion.

These tests showed that (a) methyl alcohol is ineffective while methyl ethyl ketone though not optimum is considerably better than no cosolvent at all, that (b) THF was effective, and that (c) both n-butyl and n-propyl alcohol looked excellent and were definitely better than isopropyl alcohol. In subsequent studies, n-propyl alcohol was found superior to n-butyl and isopropyl alcohol.

Although unsulfonated butyl rubber and butyl rubber having less than 0.5 mole percent sulfonation can be emulsified using ionic emulsifiers, it was not possible to emulsify sulfonated butyl rubber containing at least 0.5 mole percent unsaturation with ionic emulsifiers. A wide range of cationic and anionic emulsifier systems was used in unsuccessful attempts at emulsifying these sulfonated butyl rubbers.

The cosolvent of this invention must be present in the cement at at least 5 wt. percent based on the cement. Preferably at least 50% of the cosolvent used is in the cement and the remainder is dissolved or dispersed into the water phase. There is no apparent advantage in utilizing more than 25 wt. percent of cosolvent based on the cement. Preferably about 10 to about 25 wt. percent based on the cement of a cosolvent is used; more preferably about 15 to 25 wt. percent; most preferably about 18 to about 22 wt. percent.

What is claimed is:
1. A process for preparing an emulsion of sulfonated butyl rubber which comprises:
    (1) preparing a cement of a sulfonic acid containing butyl rubber having at least 0.5 mole percent sulfonation in a vehicle which is a solvent for the rubber;
    (2) adding to the cement so formed about 5 to about 25 weight percent based on the cement of a $C_2$ to $C_{10}$ polar organic solvent containing oxygen in the form of an alcohol, ether, ketone or ester, having a dielectric constant of about 3 to about 50; and
    (3) emulsifying the cement-polar organic solution into a water phase using about 5 to about 25 wt. percent based on the rubber of an emulsifier system comprising a blend of at least two non-ionic emulsifiers selected from the group consisting of $C_8$–$C_{12}$ ethoxylated alkyl phenol, $C_{12}$–$C_{18}$ ethoxylated alcohol and an ethoxylated polypropylene oxide wherein said blend has an HLB of about 14 to about 19.

2. The process of claim 1 wherein the vehicle of the cement is selected from the group consisting of hydrocarbon solvents, chlorinated hydrocarbon solvents and mixtures thereof.

3. The process of claim 2 wherein the solvent is hexane, heptane, benzene, ethyl benzene, toluene or xylene.

4. The process of claim 1 wherein the polar solvent is n-propyl alcohol, isopropyl alcohol, butanol, tetrahydrofuran or ethyl acetate.

5. The process of claim 1 wherein about 15 wt. percent to about 25 wt. percent based on the cement of polar cosolvent is used.

6. The process of claim 1 wherein about 50% of the polar cosolvent is in the water phase and the total cosolvent used is about 10 to about 25 wt. percent based on the cement.

7. The process of claim 6 wherein the polar organic cosolvent concentration is about 15 to about 25 wt. percent based on the cement.

8. The process of claim 7 wherein the polar organic cosolvent concentration is about 18 to about 22 wt. percent.

9. The process of claim 1 wherein the emulsifier system comprises two parts by weight of an ethyoxylated octyl phenol comprising 30 moles of ethylene oxide and one part by weight of an ethoxylated nonyl phenol comprising 6 moles of ethylene oxide.

10. The process of claim 1 wherein the emulsifier system comprises two parts by weight of an ethoxylated octyl phenol comprising 30 moles of ethylene oxide and one part by weight of an ethoxylated octyl phenol comprising 9.5 moles of ethylene oxide.

11. The process of claim 1 wherein the emulsifier system comprises two parts by weight of an ethoxylated octyl phenol comprising 30 moles of ethylene oxide and one part of an ethoxylated nonyl phenol comprising 4 moles of ethylene oxide.

12. The process of claim 1 wherein the emulsifier system comprises one part by weight of an ethoxylated octyl phenol comprising 30 moles of ethylene oxide, one part of an ethoxylated polypropylene oxide comprising 85 wt. percent ethylene oxide and having a polypropylene oxide chain molecular weight of about 1750 and two parts of an ethoxylated nonyl phenol comprising 6 moles of ethylene oxide.

13. The process of claim 1 wherein the emulsifier system comprises one part of an ethoxylated octyl phenol comprising 30 moles of ethylene oxide and one part of an ethoxylated tridecyl alcohol comprising 15 moles of ethylene oxide.

14. The process of claim 1 wherein the emulsifier system comprises one part of an ethoxylated tridecyl alcohol comprising 30 moles of ethylene oxide, one part of an ethoxylated nonyl phenol comprising 6 moles of ethylene oxide, 0.15 part of an ethoxylated polypropylene oxide comprising 85 wt. percent ethylene oxide having a polypropylene chain molecular weight of about 1750 and 0.85 part of an ethoxylated polypropylene oxide comprising 15 wt. percent ethylene oxide having a polypropylene chain molecular weight of about 1750.

15. The process of claim 1 wherein the emulsifier system comprises one part by weight of an ethoxylated tridecyl alcohol comprising 30 moles of ethylene oxide, one part by weight of an ethoxylated polypropylene oxide comprising about 85 wt. percent ethylene oxide having a polypropylene chain molecular weight of about 1750 and two parts by weight of an ethoxylated nonyl phenol comprising 6 moles of ethylene oxide.

16. The process of claim 1 wherein the emulsifier system comprises one part by weight of an ethoxylated polypropylene oxide comprising 85 wt. percent ethylene oxide having a polypropylene chain molecular weight of about 1750 and one part by weight of an ethoxylated alkyl alcohol comprising 17 moles of ethylene oxide.

17. The process of claim 1 wherein the emulsifier system comprises five parts by weight of an ethoxylated octyl phenol.

18. A process for preparing a latex of sulfonated butyl rubber which comprises treating an emulsion prepared by the process of claim 1 by distilling off the vehicle and polar organic solvent.

References Cited

UNITED STATES PATENTS

| | | | |
|---|---|---|---|
| 3,305,508 | 2/1967 | La Heij et al. | 260—29.7 |
| 3,310,516 | 3/1967 | La Heij et al. | 260—29.7 EM |

FOREIGN PATENTS

| | | | |
|---|---|---|---|
| 847,525 | 9/1960 | Great Britain | 260—29.7 B |

OTHER REFERENCES

Sagarin, Ed.: Cosmetics Science and Technology (Interscience, 1966), pp. 1008–1011.

Antara Chemicals Bulletin, Igepal® Surfactants (1958), pp. 2, 11, 13, 14.

MORRIS LIEBMAN, Primary Examiner

T. DE BENEDICTIS, SR., Assistant Examiner

U.S. Cl. X.R.

260—29.6 SQ, 29.7 F, EM, SE, 79.3 R